United States Patent [19]
Breiling et al.

[11] 3,809,109
[45] May 7, 1974

[54] METHOD AND APPARATUS FOR MIXING GASES UNDER PRESSURE PARTICULARLY FOR RESPIRATORS AND MEDICAL DEVICES

[75] Inventors: Hans Georg Breiling, Gross Gronau; Detlef Warnow, Lubeck, both of Germany

[73] Assignee: Dragerwerk AG, Lubeck, Germany

[22] Filed: Mar. 14, 1972

[21] Appl. No.: 234,637

Related U.S. Application Data

[63] Continuation of Ser. No. 42,672, June 2, 1970, abandoned.

[30] Foreign Application Priority Data

June 25, 1969 Germany............................ 1932141

[52] U.S. Cl............................ 137/88, 137/607
[51] Int. Cl. ........................ A62b 7/02, G05d 11/03
[58] Field of Search ......... 137/3, 7, 12, 14, 88, 607; 138/46

[56] References Cited
UNITED STATES PATENTS

| | | | |
|---|---|---|---|
| 3,243,157 | 3/1966 | Beck .................................. | 251/122 |
| 3,534,753 | 10/1970 | Ollivier ............................ | 137/88 X |
| 1,698,826 | 1/1929 | Shaffer............................. | 138/46 X |
| 3,369,558 | 2/1968 | Hughey ............................ | 137/88 |
| 2,074,883 | 3/1937 | Ziebolz et al.................... | 137/3 |
| 3,094,192 | 9/1937 | Schmidt............................ | 137/3 |
| 3,464,434 | 9/1969 | Nielsen ............................. | 137/7 X |
| 3,515,155 | 5/1970 | Haffner et al.................... | 137/7 |

Primary Examiner—Alan Cohan
Attorney, Agent, or Firm—McGlew and Tuttle

[57] ABSTRACT

Gases under pressure are mixed by directing the gases through two separate conduits while the pressure in one of the conduits is regulated by a pressure regulator to a desired mixing pressure and the pressure in the other conduit is passed through a pressure valve which is operated in proportion to the regulated pressure in the first conduit. The gases are then directed through separate throttles in the respective conduits to a common mixing line while the valves of the throttles are regulated together in order to vary the mixing ratio and the flow area through each throttle while the combined flow area is maintained constant. The throttle valves include valve members which are movable in respect to the associated valve seat to provide a constant variation of the flow area for the gases and each valve is connected to a gear which is rotated by a central common gear which is affixed to a hand wheel adjustment. The regulation of the hand wheel effects a simultaneous proportionate opening and closing of each of the throttle valves. In addition the valves are constructed so that the changes which are produced by one produces a corresponding change of the other so that the overall output flow through the valves is constant.

2 Claims, 1 Drawing Figure

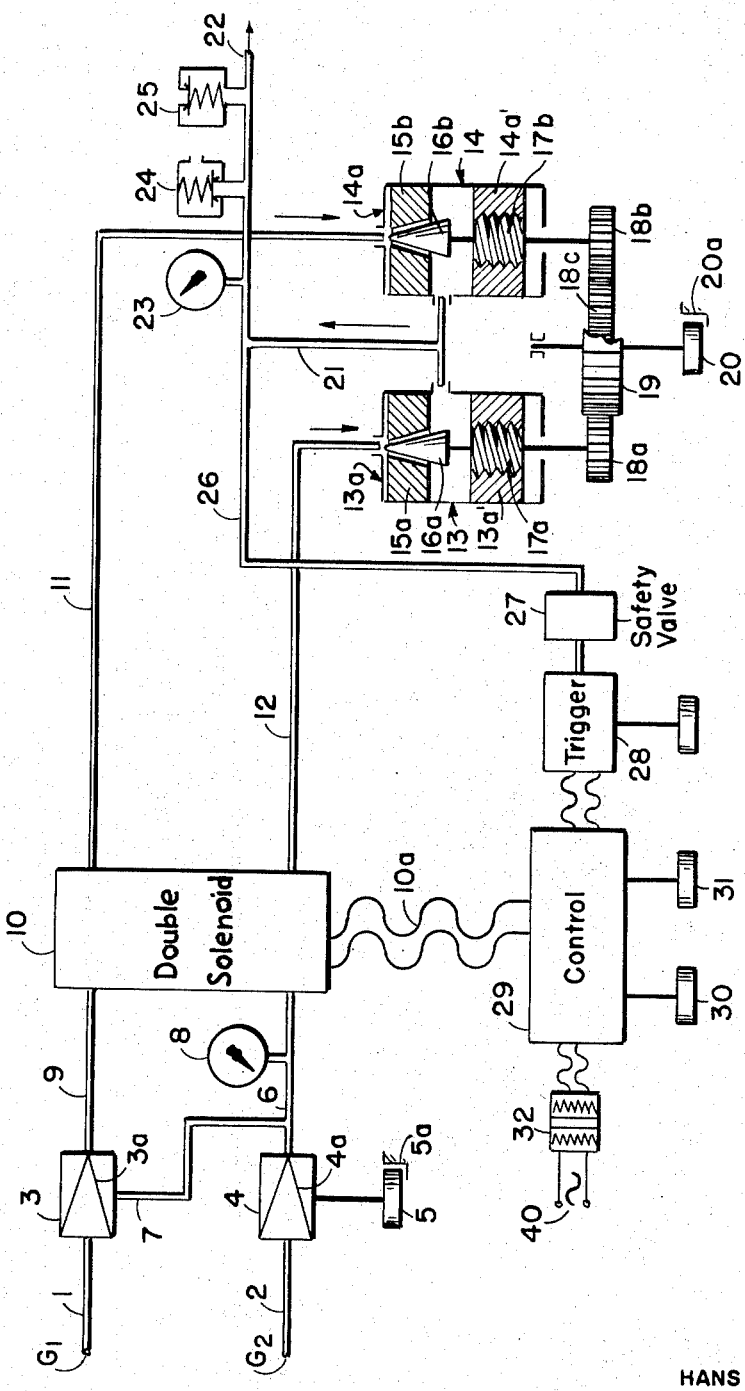

3,809,109

METHOD AND APPARATUS FOR MIXING GASES UNDER PRESSURE PARTICULARLY FOR RESPIRATORS AND MEDICAL DEVICES

This is a continuation, of application Ser. No. 42,672 filed June 2, 1970 now abandoned.

SUMMARY OF THE INVENTION

This invention relates in general to a method and apparatus for mixing gases, and in particular, to a new and useful method and apparatus particularly for mixing gases for respirators and similar medical devices wherein the gases are regulated to desired pressures as they are delivered through two separate conduits into throttle valves, the latter being regulated to vary the mixing ratio while maintaining the combined flow area of the gases.

Various methods and apparatus for mixing gas currents are known. One method comrpises expanding the two pressure gases over separate throttle valves and flow meters in a common discharge pipe and achieving a desired mixing ratio by the use of flow meters. Such a method has the disadvantage that the flow meters and the throttle valves must be constantly checked. In addition one must make sure that a certain pressure is always exactly maintained in the flow meters, or the reading of the flow meters will be incorrect. These known methods also require the exact maintenance of a certain discharge pressure. With another known method, two pressure gases are expanded to atmospheric pressure and sucked in by means of piston pupms of variable stroke volume and forced into a discharge pipe. Such a method has a disadvantage that it requires a great deal of equipment such as piston pumps and the drives for such pumps and control devices.

In accordance with the present invention there is provided an improved method which permits the production of a gas mixture of two pressure gases which may be set exactly to a certain ratio and by employing simple means and avoiding the disadvantages of the prior art. The invention permits the setting of the flow rate of such a gas mixture with simple means to a desired value without changing the mixing ratio. The invention concerns particularly a method for mixing pressure gases for respirators and medical devices. The gases to be mixed in accordance with the invention are directed through separate conduits at adjustable pressures which may be set for example, by a hand wheel control. The pressure in each conduit is maintained in a desired ratio to the other and above the critical pressure of the gases. Each conduit is arranged to discharge into an adjustable throttle and both throttles are arranged and interconnected such that the sum of their resistance is constant. The method of the invention has the advantage that a gas mixture of a certain concentration ratio is produced properly with simple means and this concentration ratio is not changed by a variation of the pressure. The rate of flow was determined by varying the pressure ahead of the throttles but leaving the ratio of the gas pressure at the delivery to the throttles always constant. On the other hand, the mixing ratio is determined by simultaneously adjusting each throttle in such a way that the sum of their resistances is constant.

In the method of the invention, it is thus possible to adjust the rate of flow and the mixing ratio but each adjacent is independent of the other. In addition, the method has the advantage that the selected adjustments are independent of the back pressure in the discharge pipe for the mixed gas. This is due to the fact that the front pressure of the gases to be mixed ahead of the throttles is greater than their critical pressure.

The invention concerns furthermore a gas mixing apparatus for carrying out the inventive method which according to the invention includes an adjustable pressure reducer arranged in each pressure gas feed pipe at a location before it opens into the combined gas flow pipe or mixing pipe downstream of the throttles. Both pressure reducers expand the pressure gases to pressures which are always in the same pressure ratio to each other and which are above the respective critical pressures and they do this i the conduit ahead of the throttles. Adjustable throttles of constant length are interposed between the gas lines and the combined line or mixing line and the throttles are operated in a manner such that the sum of the throttle cross sections is maintained constant. The apparatus includes simple means for adjusting the rear pressure ahead of the throttle and the rate of flow in the apparatus can be set by adjusting the pressure reducers. The reducers are so adjusted that their rear pressures are always in the same pressure ratio to each other. The mixing ratio of the gases can be achieved by adjusting the throttles, each of which has a constant length during the adjustment and which are so connected with each other that the sum of their throttle cross sections remain constant.

One simple embodiment comprises an arrangement in which the initial stress of the control diaphragm of one of the pressure reducers is adjustable in a known manner and the discharged pressure of this reducer loads the control diaphragm of the other pressure reducer. This arrangement has the advantage that in order to set the pressure ahead of the throttles it is only necessary to adjust the initial stress of the control diaphragm of the one pressure reducer and they will be correspondingly adjusted with each other in the same ratio. The apparatus advantageously includes a spindle with a handle wheel which permits the adjustment of the initial stressing of the control diaphragm of one pressure reducer and such a spindle is advantageous provided with an indicator for setting the desired pressure. The indicator can be calibrated in rate of flow such as liters per minute. In order to facilitate the setting of the desired mixing ratio, the adjusting spindles of the throttles can be so coupled with each other through gear wheels that when the flow cross sections of the throttles are adjusted the sum of the cross sections is constant and the throttle lengths of each throttle is constant in the entire adjustment range.

In order to be able to shut off the gas flow completely and to start the flow again without changing the gas mixing ratio immediately after the shut off valve has been opened, jointly actuated shut off valves can be arranged in accordance with another feature of the invention in the gas conduit between the pressure reducers and the adjustable throttles.

Accordingly, it is an object of the invention to provide an improved method for mixing gases under pressure which comprises directing the gases through two separate conduits while regulating the pressure through one of the conduits to a desired mixing pressure while the other is held at a pressure in constant proportion to the regulated pressure, and directing the gas from each conduit through separate throttles into a common mixing line while the throttle valves are regulated to vary the mixing ratio by an amount which maintains the combined flow area constant.

A further object of the invention is to provide a device for mixing gases which includes an adjustable pressure regulator in a first conduit having a back pressure connection to a pressure valve and a second conduit arranged so that the adjustment of pressure in the first conduit provides an adjustment of the pressure in the second conduit in proportion thereto and which further includes a connection of each said first and second conduits to throttles having means for varying the valve setting thereof for flow of the gases from the two conduits into a mixing conduit in selected proportions with the total proportion being maintained constant.

A further object of the invention is to provide a device for mixing gases under pressure which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

The only FIGURE of the drawings is a schematic indication of a gas supply for a respirator constructed in accordance with the invention.

GENERAL DESCRIPTION OF THE PREFERRED EMBODIMENT

Referring to the drawings in particular, the invention embodied therein comprises a gas mixing device wherein two gases G1 and G2 to be mixed with each other are permitted to flow at excess pressure or at a pressure above critical pressure for example, through conduits or pipes 1 and 2. The conduits contain pressure reducers 3 and 4, one of which, the pressure reducer 4, is adjustable. The initial stress of the control diaphragm 4a of the reducer 4 is connected so that it can be varied infinitely by means of an adjustable hand wheel 5. The hand wheel 5 is advantageously provided with indicator means 5a, which indicates directly the gas flow in liters per minute.

In the embodiment illustrated another indicator for the rate of flow in the form of a manometer 8 is connected to a lower pressure pipe 6 on the discharge side of the pressure reducer 4 and this has a scale which can be calibrated, for example, directly in liters per minute. A branch line 7 connects the rear pressure side of the reducer 4 and conduit 6 with the rear pressure side of the reducer 3 so as to provide a pressure influence on the pressure diaphragm 3a of the reducer which is equivilant to the pressure in the conduit 6. The control diaphragm 3a is thus always loaded with the rear pressure of the pressure reducer 4 and this has the result that the rear pressure in the conduit 9 at the discharge of the reducer 3 and the pressure in the conduit 6 are practically always maintained in the same ratio to each other. In the embodiment of the invention, it is assumed that the pressures in the conduits 6 and 9 are equal, but they can be set between 1.2 and 5 excess atmospheres.

A double solenoid which is schematically indicated at 10 includes two magnetically operated valve elements (not shown) one in each line 6 and 9 which permits shutting off of these lines under a control pulse which is transmitted through cables 10a from a control device 29. The respective lines 6 and 9 connect through the valves of the double solenoid 10 to lines 12 and 11 respectively, which lead to adjustable throttles 13 and 14 respectively.

In accordance with a further feature of the invention the throttle 13 and 14 each include a housing 13a and 14a respectively with valve seat members 15a and 15b respectively, into which respective conical valve parts 16a and 16b protrude. The valve parts 16a and 16b are longer than the associated seat members 15a and 15b and designed so that they always traverse the valve seats 15a and 15b over their entire length so that the length of each throttle in the associated valve seats is always the same over the entire adjustment range. The valve parts 16a and 16b are secured to adjusting spindles 17a and 17b which have threaded portions which are threaded into lower housing parts 13a and 14a respectively; which, in turn, are respectively connected to gear wheels 18a and 18b for rotation therewith. The gear wheels 18a and 18b are maintained in meshing engagement with a central gear wheel 18c which is driven by a central drive gear 19 which is connected at its shaft to a hand wheel 20 which is provided with an indicator 20a which can be calibrated directly in percent of mixing ratio. Valve movement means comprise the drive gear 19, gears 18a, 18b and 18c and spindles 17a and 17b which together insure simultaneous valve movement in equal but opposite directions in amounts so that the sum of the cross sectional areas for gas flow remains constant.

The parts of the throttles 13 and 14 are so designed that when the throttles are adjusted by rotation of a hand wheel 20 the sum of the cross sections 13a of the throttle 13 and of the cross section 14a of the throttle 14 is constant in all positions. This has the result that when the throttles are adjusted the mixing ratio of the gases to each other is likewise adjusted but the entire rate of flow through the apparatus is not changed. This is true even if a common flow conduit or discharge pipe 21 which connects the discharge of both throttles 13 and 14 varies in size. The gases which are discharged into the discharge conduit 21 mix and are conducted through a pipe section 22 to a location of use, for example, by a patient (not shown). The pressure in the discharge pipe 21 can be maintained at 100 cc of water column, for example, or can vary. The discharge pipe connects into a cross section 22 which has a manometer 23, a safety valve 24 and an additional air valve 25. Another cross pipe 26 leads from the combined pipe or discharge 21 through a relief pressure safety valve 27 to an adjustable trigger assembly 28. With aided respiration an under pressure impulse by the patient will produce in the contact free switch an electric impulse which is conducted to the control unit 29. The control unit 29 transmits the impulse through connections 10a to the double solenoid valve 10 which is opened.

In a controlled respiration the control device can serve to adjust the frequency. The frequency adjustment is effected by the hand wheel 30. The ratio of the duration of inspiration time and expiration time can be set with the hand wheel 31. The control device is fed with suitable electric current from a source 40 through a transformer 32.

The pressure of the gases G1 and G2 to be mixed with each other is set by means of a hand wheel 5 but the ratio of the pressure gases in the pipes 11 and 12 will remain always the same. The higher these pressures the greater the amount which issues from the throttles 13 and 14 into the discharge line 21. The rate of flow can thus be regulated with the hand wheel 5.

On the other hand, the mixing ratio of the gases can be satisfactorily regulated with the throttles 13 and 14 since the gases ahead of the throttles are under pressure above the critical pressure so that the amount of pressure in the discharge pipe 21 has no effect on the mixing ratio. The critical pressure ratio for a two-atomic gas is:

$$(P_2/P_1) \text{ CRITICAL} \leq 0.53.$$

Because of the maximum respiration pressure $P_2 \leq 1.1$ ATMOSPHERES ABSOLUTE they must have:

$P_1 = 1.1/0.53$ ATA $\leq 2.08$ as the lower limit is therefore selected $P_1 \leq 1.2$ ABOVE ATMOSPHERIC.

By corresponding dimensioning and design of the valve seats 15a, 15b and the movable valve parts 16a and 16b we obtain annular slots 13a and 14a having cross sectional surfaces which vary approximately linearly in dependence on the stroke of the valve spindle This stroke is set by turning the hand wheel 20. Corresponding to the transmission ratio of the gear wheels 18a, 18b and 19 the entire desired concentration range within which the adjustment is to be effected can be achieved with a single rotation of the hand wheel 20.

What is claimed is:

1. A gas mixing device comprising a common mixing line, first and second throttle members each having a respective first and second conical valve seat member with a respective flow opening therethrough bounded by a respective first and second valve seat, a respective first and second conical valve part extending along and coextensive with all portions of its associated valve seat and being movable relatively to its associated valve seat to vary the flow therethrough and being coextensive with the associated first and second valve seat in all operative positions, valve movement means connected to said first and second valve parts for adjusting said valve parts to move them together at all times and proportionally in respective opposite directions to vary the flow areas to said throttle members in inversely proportional amounts while maintaining the total area from said throttle members into said mixing line constant, said first and second conical valve seat members and said first and second conical valve parts being shaped and arranged so that the flow areas through said valves always total the same even though the respective flow areas vary when said valve parts are moved, and means for directing gases to be mixed separately into each of said throttle members and for maintaining the gases in a constant pressure ratio to each other and above the critical pressure ratio of said gases, said means for directing gases through said first and second throttle members including first and second conduits connected respectively to said first and second throttle members, first and second pressure reducers associated with said first and second conduits respectively, an electrically controlled shut-off valve located between said first and second reducers and said first and second throttle members, and control means connected to electrically actuated first and second valve parts, said pressure reducers being adjusted to maintain pressure sufficiently high to achieve critical pressure differential across each of said throttle members throughout the entire range of their setting.

2. Apparatus according to claim 1, including a trigger mechanism associated with said apparatus connected to said mixing conduit and being responsive to the pressure in said mixing conduit to actuate said first and second valve members.

* * * * *